United States Patent
Katz et al.

(10) Patent No.: US 9,740,997 B2
(45) Date of Patent: Aug. 22, 2017

(54) METHOD AND SYSTEM FOR INPUT DRIVEN PROCESS FLOW MANAGEMENT

(71) Applicant: Ellison Information Manufacturing Inc., Toronto (CA)

(72) Inventors: Jacob Katz, Toronto (CA); Kevin Ellison, Toronto (CA)

(73) Assignee: Schedule 1 Inc., Toronto (CA)

( * ) Notice: Subject to any disclaimer, the term of this patent is extended or adjusted under 35 U.S.C. 154(b) by 113 days.

(21) Appl. No.: 14/286,916

(22) Filed: May 23, 2014

(65) Prior Publication Data

US 2014/0351818 A1    Nov. 27, 2014

Related U.S. Application Data

(60) Provisional application No. 61/826,854, filed on May 23, 2013.

(51) Int. Cl.
*G06F 9/46* (2006.01)
*G06Q 10/06* (2012.01)

(52) U.S. Cl.
CPC ..... *G06Q 10/0631* (2013.01); *G06Q 10/0633* (2013.01)

(58) Field of Classification Search
None
See application file for complete search history.

(56) References Cited

U.S. PATENT DOCUMENTS

| | | | |
|---|---|---|---|
| 7,987,299 B2* | 7/2011 | Damien | G06F 8/36 710/20 |
| 2006/0015873 A1* | 1/2006 | Dettinger | G06F 9/5038 718/102 |
| 2009/0216975 A1* | 8/2009 | Halperin | G06F 9/45537 711/162 |
| 2013/0139164 A1* | 5/2013 | Balko | G06F 8/35 718/102 |

* cited by examiner

*Primary Examiner* — Gregory A Kessler
(74) *Attorney, Agent, or Firm* — Osha Liang LLP

(57) ABSTRACT

A method for input driven process flow management includes receiving a request, each request having an input and an output, identifying tasks for a process fit for the request type, receiving inputs; generating, based on the inputs and the process, a process flow step, and executing the process flow step to generate results (outputs). The method further includes receiving a second set of inputs, different than the first set of inputs, generating, based on the second set of inputs and the process, a second process flow step different than the first process flow, and executing the second process flow step to generate a second set of results, and so on, until all tasks are executed, or a termination task has been reached.

20 Claims, 5 Drawing Sheets

METHOD AND SYSTEM FOR INPUT DRIVEN PROCESS FLOW MANAGEMENT

CROSS-REFERENCE TO RELATED APPLICATIONS

This application claims benefit of U.S. Provisional Application No. 61/826,854 filed on May 23, 2013, entitled "METHOD AND SYSTEM FOR INPUT DRIVEN PROCESS FLOW MANAGEMENT." The disclosure of the U.S. Provisional Application is incorporated herein by reference in its entirety.

BACKGROUND

Process flow management is a complicated task for many organizations, individuals, and/or machines. Historically, designing a process flow was a technically challenging task, as the process needed to be described down to the finest detail, such as declaration of variables and error handling routines. Later, tools evolved to make the process easier to visualize and build. Some of these tools used flowcharts, Unified Modeling Language (UML), Business Process Model and Notation (BPMN), and/or many other options. All of the historical methods share a common problem— they are meant for "technical" individuals. That is, a typical businessman lacks the necessary skills to implement a successful process flow. This is because the historical tools require the designer to specify the flow of data between tasks that have to complete during the process and account for things that may go wrong. If the process flow is not fully thought out in advance, and something unexpected arises, the process flow is unable to complete, unless the designer with the required skills has explicitly accounted for the unexpected event. Typically, many different people must work together closely to arrive at a process flow for solving a given problem. Any steps taken to make this process easier would be welcomed.

SUMMARY

In general, in one aspect, the invention relates to a method for input driven process flow management, comprising receiving a plurality of requests, each request of the plurality of requests comprising an input and an output; identifying a subset of a plurality of tasks for a process; receiving a first set of inputs; identifying, based on the first set of inputs and the subset, a first task of the subset to start as a first process flow step for the process; executing the first process flow step to generate a first result; receiving a second set of inputs, comprising at least the first result; identifying, based on the second set of inputs and the subset, a second task of the subset to start as a second process flow step for the process, wherein the second process flow step is different than the first process flow step; and executing the second process flow step to generate a second result.

In general, in one aspect, the invention relates to a non-transitory computer readable storage medium comprising computer readable code for input driven process flow management. The computer readable code, when executed by a processor, comprises functionality to receive a plurality of requests, each request of the plurality of requests comprising an input and an output; identify a subset of the plurality of tasks for a process; receive a first set of inputs; identify, based on the first set of inputs and the subset, a first task of the subset to start as a first process flow step for the process; execute the first process flow step to generate a first result; receive a second set of inputs, comprising at least the first result; identify, based on the second set of inputs and the subset, a second task of the subset to start as a second process flow step for the process, wherein the second process flow step is different than the first process flow step; and execute the second process flow step to generate a second result.

In general, in one aspect, the invention relates to a system for input driven process flow management, the system comprising a computer processor; and a memory storing instructions. The instruction, when executed by the computer processor, comprise functionality to: receive a plurality of tasks, each task of the plurality of tasks comprising an input and an output; identify a subset of the plurality of tasks for a process; receive a first set of inputs; identify, based on the first set of inputs and the subset, a first task of the subset to start as a first process flow step for the process; execute the first process flow step to generate a first result; receive a second set of inputs, comprising at least the first result; identify, based on the second set of inputs and the subset, a second task of the subset to start as a second process flow step for the process, wherein the second process flow step is different than the first process flow step; and execute the second process flow step to generate a second result.

Other aspects and advantages of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1, 2, 3A, 3B, and 4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to input driven process flow management. A process flow is the specific sequence/ordering of tasks in order to generate some result. In particular, the present invention is able to generate a process flow based on an identified process and inputs. A process is the set of tasks needed to generate some result, but are not necessarily in any specific order. Specifically, in one or more embodiments of the invention, tasks are received. Each task has one or more inputs and/or one or more outputs. Subsequently, a process step, consisting of a subset of the tasks, is identified, and a set of first inputs is received. Based on the process and the first inputs, a first process step flow occurs as tasks with sufficient inputs are started. Subsequently, the started tasks generate a first set of results (outputs). When a second, set of inputs are received, such as the outputs from the previous step, a second process step occurs based on the process and the accumulation of first and second inputs. The second process step includes all the tasks that have sufficient inputs to start but have not started previously, which may be the same or different than the first process step, dependent upon what the inputs were. The second process flow step is then executed, and the next results (outputs) are generated. These process steps continue until no further tasks to be executed remain for finishing the process, or a "termination" task is started, which indicates that the process has completed.

Figure 1:
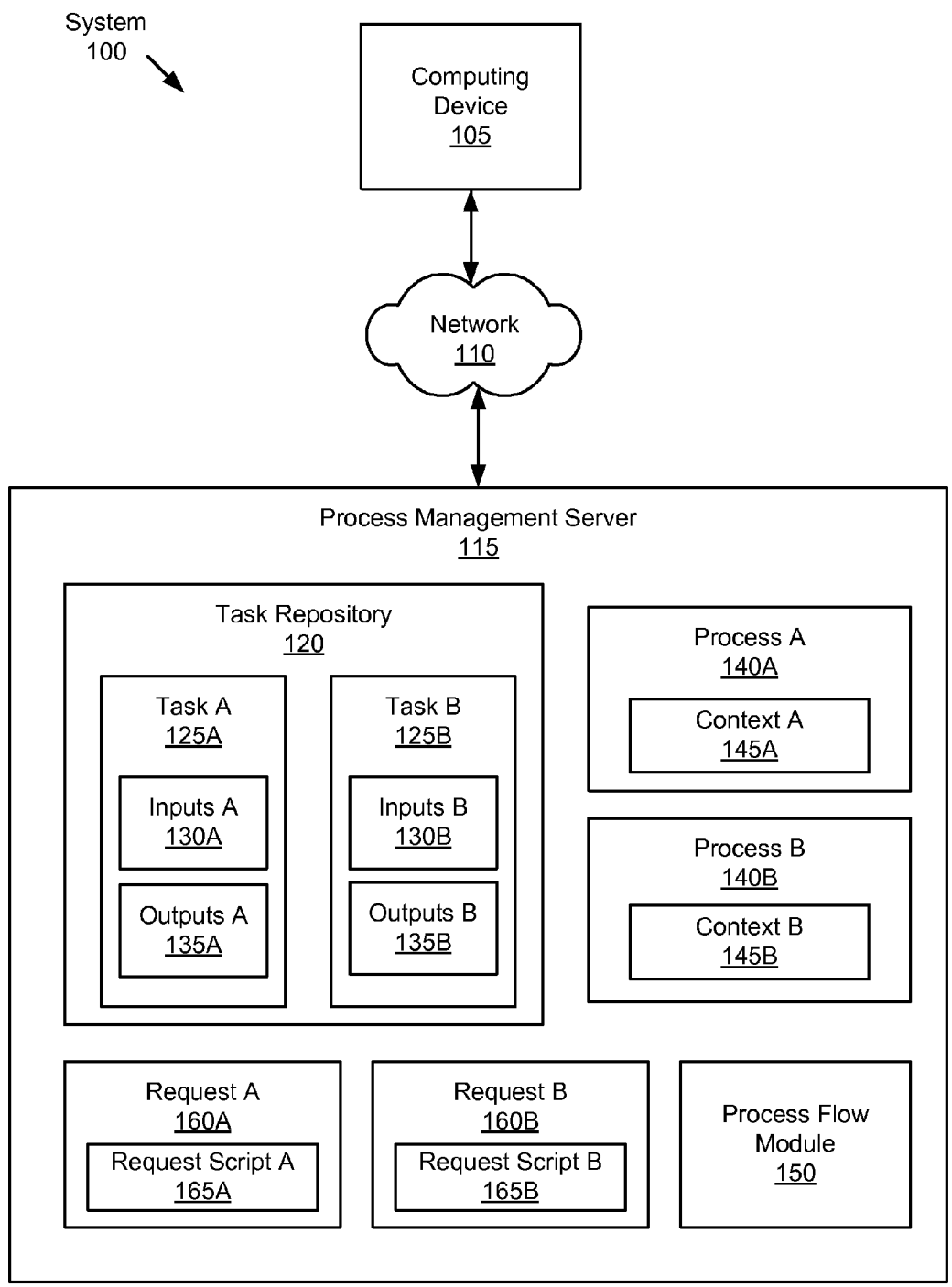
FIG. 1 shows a system in accordance with one or more embodiments of the invention.

FIG. 1 shows a system in accordance with one or more embodiments of the invention. As shown in FIG. 1, system (100) includes a computing device (105), a network (110), a process management server (115), a task repository (120), task A (125A), task B (125B), inputs A (130A), inputs B (130B), outputs A (135A), outputs B (135B), process A (140A), process B (140B), context A (145A), context B (145B), and a process flow module (150). In one or more embodiments of the invention, the system depicted in FIG. 1 may take the form of a networked system where one or more of the components communicate by and/or through a network, such as network (110).

A network system may be formed by one or more computers, laptops, smartphones, servers, or other similar devices (i.e., devices with a processor) that are communicatively connected using wired or wireless components. For example, the wired components may include telephone lines, fiber, and/or any other electrical or optical cable(s). Further, the wireless components may include a Wi-Fi connection, a satellite connection, wireless telecommunication connections (e.g., 3G, 4G, etc.), and/or any other suitable connection. In one or more embodiments of the invention, the various wired and/or wireless connections may be secured through physical means (e.g., a secured wired connection that is inaccessible to others, etc.) and/or software methods (e.g., Transportation Layer Security (TLS), Secure Sockets Layer (SSL), etc.). The various computing devices may communicate by sending packets of data amongst themselves. The data packets are routed via routers, switches, and/or other components, from the transmitting device to a receiving device. The data packets may be formatted or organized in any manner now known or later developed, such as Transmission Control Protocol (TCP) of the Internet Protocol (IP) suite.

In one or more embodiments of the invention, the computing device (105) may be any computing device including, but not limited to: a desktop computer, a laptop computer, a smart phone, a cell phone, a handheld gaming device, a cable box, a server, a rack, etc. The computing device (105) may have a variety of applications installed, such as a financial application, a web browser, etc. Further, the computing device (105) may be multiple devices, such as a group of connected computers accessing shared data, as in an office environment. In one or more embodiments of the invention, the network (110) is a wide area network (WAN), such as the Internet, a local area network (LAN), and/or any other network using wired and/or wireless communication.

In one or more embodiments of the invention, the process management server (115) is any computing device including, but not limited to: a desktop computer, a laptop computer, a smart phone, a table, a glass appliance, a cell phone, a handheld gaming device, a cable box, a server, a rack, etc. The process management server (115) includes one or more storage devices (not shown), including, but not limited to: memory, hard drives, cloud storage, removable storage media, optical drives, and/or any other storage device or component. In one or more embodiments of the invention, the process management server (115) may be distributed across multiple computing devices or nodes. In one embodiment, the process management server (115) may be located on a single device. The process management server (115) includes functionality for generating and managing process flows. Specifically, the process management server (115) includes functionality to identify and/or receive tasks, inputs, and processes, execute a process flow, and send results to any suitable recipient. The process management server (115) includes the task repository (120), task A (125A), task B (125B), inputs A (130A), inputs B (130B), outputs A (135A), outputs B (135B), process A (140A), process B (140B), context A (145A), context B (145B), and the process flow module (150).

In one or more embodiments of the invention, the task repository (120) is a "toolbox" of pre-built tasks. The tasks may be "wrappers" and/or references to tasks pre-built and executed by a third party potentially on another system (e.g. a remote service, a cloud based application, etc.), such as task A (125A) and task B (125B). The task repository (120) may be stored in any suitable location, and in any format now known or later developed. In one or more embodiments of the invention, the task repository (120) includes functionality to store any number (i.e. quantity) and/or size of individual tasks, task references, and/or "wrappers". The task repository (120) may be slowly built up over time, as more and more tasks may be added to the task repository (120) as the invention is used, thereby increasing the amount of processes that may be performed using the tasks available in the task repository (120).

A task (i.e., task A (125A) and/or task B (125B)) is a series of one or more steps that specializes in performing a specific technical function without regard for the role of the task within a larger process. In other words, each task is completely independent of any other task. In one or more embodiments of the invention, task A (125A) and/or task B (125B) may be a computer program, a web service, a cloud based service, or any computer process that does something specific, that a process modeler may find useful for incorporating into the process flow. Tasks may be created using any suitable method and/or format now known or later developed. Task A (125A) and task B (125B) may include functionality for any purpose. For example, task A (125A) may include functionality for accessing an e-mail, while task B (125B) may include functionality for calculating a sales tax. In one or more embodiments of the invention, task A (125A) and task B (125B) are stateless.

In one or more embodiments of the invention, task A (125A) and task B (125B) each include one or more pre-defined inputs (i.e., inputs A (130A) and inputs B (130B)) and one or more pre-defined outputs (i.e., outputs A (135A)

and outputs B (135B)). The inputs (i.e., inputs A (130A) and inputs B (130B)) may be any data, information, results, or other item suitable as input for a task. Inputs A (130A) and inputs B (130B) may be received from any source including, but not limited to: computing device (105), local storage on the process management server (115), manual entry, other tasks, etc. In one or more embodiments of the invention, time and/or a task/process timing out may be an input. It will be apparent to one of ordinary skill in the art, having the benefit of this disclosure, that inputs A (130A) and inputs B (130B) may be of many different types and, as such, the invention should not be limited merely to the above examples.

In one or more embodiments of the invention, one or more of the tasks involve determining whether an authentication credential is valid, such methods using a personal identification number (PIN), password, token, or certificate. In one or more embodiments of the invention, one or more of the tasks involve determining whether one node is permitted to execute a task, and whether the task is permitted to delegate execution to another node using a cryptographic authorization mechanism.

A request (i.e., request A (160A) and/or request B (160B)) is received by and/or sent from the process management server. In one or more embodiments of the invention, request A (160A) and/or request B (160B) may be a message, or any computer process that does something specific, such as triggering one or more tasks or may be used to identify tasks.

In one or more embodiments of the invention, request A (160A) and request B (160B) each include one or more pre-defined request scripts (e.g., request script A (165A) and request script B (165B)). Specifically, tasks may be identified in a request script (e.g., request script A (165A) and request script B (165B)), or other similar file. The script (e.g., request script A (165A) and request script B (165B)) is typically a list of tasks that a human or a machine has generated as the collection of possible tasks to be executed in order to accomplish a process that will be able to process the type of requests described above and below in Step 200 of FIG. 2.

It will be apparent to one of ordinary skill in the art, having the benefit of this disclosure, that request A (160A), request B (160B), request script A (165A), and/or request script B (165B) may be of many different types and, as such, the invention should not be limited merely to the above examples.

In one or more embodiments of the invention, outputs A (135A) and outputs B (135B) may take any form, such as data items, debugging information, calculations, results, etc. In one or more embodiments of the invention, outputs A (135A) and outputs B (135B) include at least an execution result and an execution error, and may include any additional/other data generated by the task. The execution result includes, but is not limited to: a predefined list of values that indicate whether the task has not started, is executing, has finished successfully, has failed, and/or has timed out. These predefined values enable the process flow module (135) to manage the flow of tasks. Similarly, the execution error includes specific reasons for a failure of a given task. In one or more embodiments of the invention, outputs A (135A) and/or outputs B (135B) may be generated at any point during a task. For example, an output may be generated at the beginning of a task, after 30 seconds of performing a task, and/or upon completion of the task. It will be apparent to one of ordinary skill in the art, having the benefit of this disclosure, that outputs A (135A) and outputs B (135B) may be of many different types and, as such, the invention should not be limited merely to the above examples.

Using the earlier example of accessing an e-mail, an input to the e-mail accessing task may be an e-mail account name and password, while the output may be the first unread e-mail in the e-mail account. Using the earlier example of calculating a sales tax, the inputs to the sales tax task may be a total amount, and a tax rate, while the output may be the amount of sales tax owed. In one or more embodiment of the invention, task A (125A) and task B (125B) need not be compatible with each other, or any specific task.

In one or more embodiments of the invention, process A (140A) and/or process B (140B) are groupings of tasks needed to produce a given result. Process A (140A) and process B (140B) may include optional tasks, and/or tasks that may not be used in each execution of the process. In one or more embodiments of the invention, process A (140A) and process B (140B) do not dictate an order in which the tasks they include should be performed. In one or more embodiments of the invention, process A (140A) and/or process B (140B) may be received from any suitable source, such as the computing device (105). Alternatively, process A (140A) and/or process B (140B) may be generated by the process management server (115). In one or more embodiments of the invention, processes (i.e., process A (140A) and process B (140B)), may dynamically add additional tasks to themselves or other processes, by manually added, or a combination thereof.

In one or more embodiments of the invention, process A (140A) includes context A (145A), and process B (140B) includes context B (145B). A context (i.e., context A (145A) and/or context B (145B)) may be a data structure including, at least, all of the data elements generated by the tasks of the process associated with the context. Each data element in the context includes at least a data element name, a data element value, and a generating task identifier. In one or more embodiments of the invention, tasks may read data elements from the context and/or write data elements to the context. When writing, the context is briefly locked, the data elements are saved/updated, and then the context is released. In one or more embodiments, the writing to the context uses a First In First Out (FIFO) queue. In one or more embodiments of the invention, the context (i.e., context A (145A) and/or context B (145B)) is able to be passed amongst multiple nodes executing a given process. It will be apparent to one of ordinary skill in the art, having the benefit of this disclosure, that by allowing the context to travel between nodes, the process is able to orchestrate what is needed to complete the process without the control of a central server. This procedure allows a process flow to be "split" between multiple remote nodes, each contributing the resources (i.e., tasks) it has available to the overall process, without executing the entire process on a single node (which is sometimes required due to confidentiality, availability or compliance considerations). In one or more embodiments of the invention, the context may include a "data dictionary" that identifies the names of inputs, outputs, tasks, etc., to ensure that a common glossary exists amongst the various tasks of a process. The "data dictionary" may include instructions for changing the format of various data elements into a different format(s), to ensure that all tasks of a process are able to communicate as needed.

In one or more embodiments of the invention, the process flow module (150) includes functionality for receiving a process and generating process flows based on available inputs. In one or more embodiments, the functionality for receiving the process and generating process flows is accomplished without human intervention.

The process may be received by the process flow module (150) in any manner and/or format now known or later developed. In one or more embodiments of the invention, the process flow module (150) includes functionality to identify the inputs, outputs, and dependencies of the tasks of the process, and dynamically create a process flow based on the inputs, outputs, and/or dependencies. The process flow module (150) further includes functionality to identify the presence of data needed for the inputs of tasks and, when sufficient inputs are found for a task, trigger the task to execute. In one or more embodiments of the invention, the process flow module (150) is constantly searching for new/additional inputs, and triggers tasks each time sufficient inputs are detected. Thus, based on the availability of inputs, the process flow module (150) may dynamically change the order of execution of the tasks, and thus optimizes the performance of the process by using the shortest and quickest path of execution. Further, in one or more embodiments of the invention, the process flow module (150) may provide a "wrapper" for adding elements to the context and/or reformatting data as needed, in addition to any other functionality to enable tasks to work together to complete a process flow.

Figure 2:
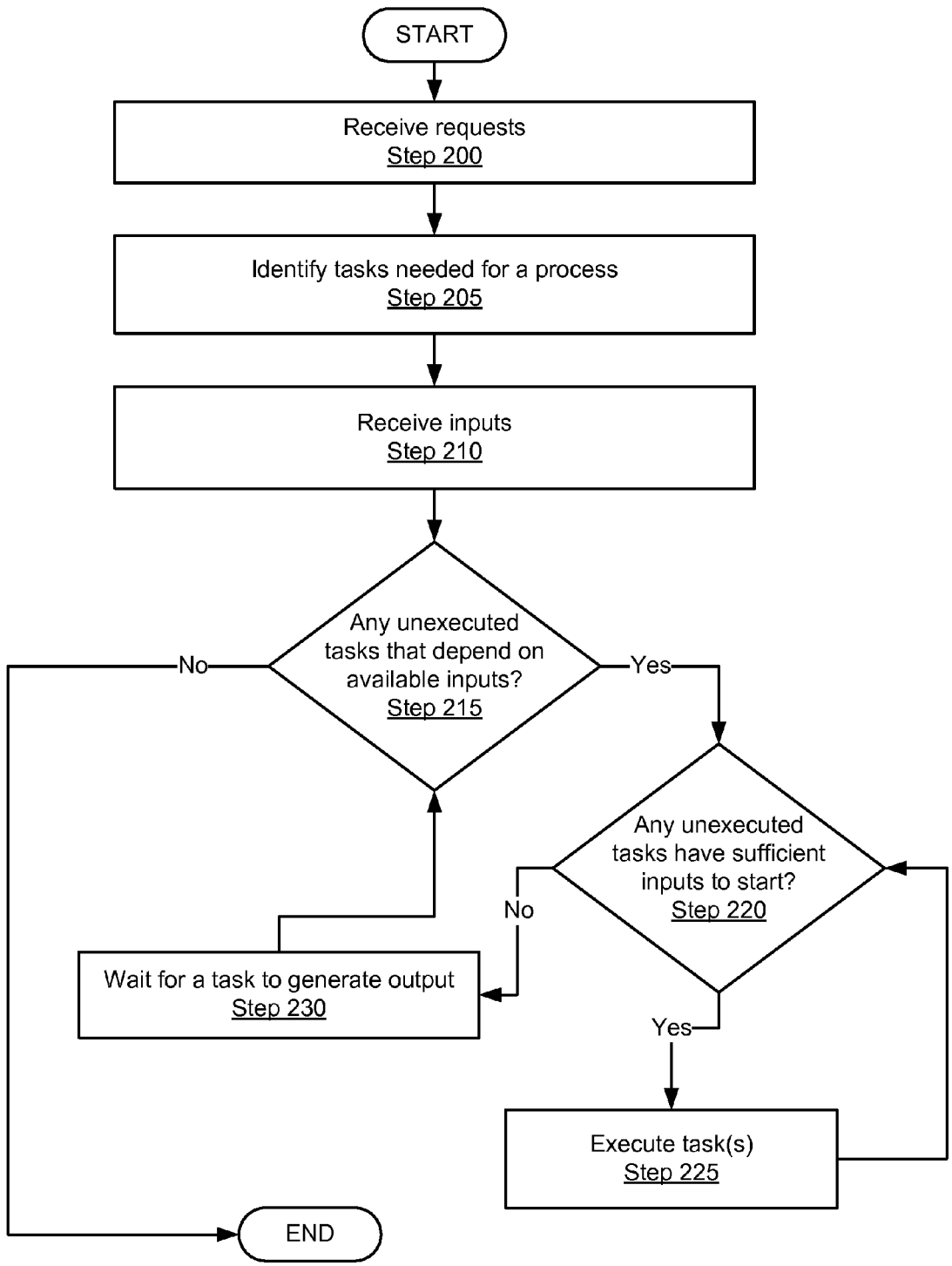
FIG. 2 shows a flow chart in accordance with one or more embodiments of the invention.

FIG. 2 shows a flowchart of a method for input driven process flow management. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In Step 200, requests are received, in accordance with one or more embodiments of the invention. The requests may be received from any source, remote or local, and may be received in any manner or format now known or later developed. The received requests may, in some way, be related to one another, may be completely unrelated, or may be some combination of both. In one or more embodiments of the invention, a given request is independent and unaware of any other request. Each request may be related to a task and includes one or more inputs and/or outputs as the data fields within the request. In one or more embodiments of the invention, the requests may be identified by an automated process.

In Step 205, the tasks needed for a process are identified, in accordance with one or more embodiments of the invention. The tasks may be identified in any manner now known or later developed. Specifically, the tasks may be identified in a script, or other similar file. The script is typically a list of tasks that a human or a machine has generated as the collection of possible tasks to be executed in order to accomplish a process that will be able to process the type of request from Step 200. In one or more embodiments of the invention, the identified tasks may be received from any suitable source.

In Step 210, inputs are received, in accordance with one or more embodiments of the invention. The inputs may be received from any source, remote or local, and may be received in any manner and/or format now known or later developed. In one or more embodiments of the invention, the first set of inputs arrive with the request, as the data fields of the request. In one or more embodiments of the invention, Step 210 may occur multiple times and/or in a different order than shown in FIG. 2. Specifically, inputs may be received during and/or after tasks run (e.g., an output of task A is used as input for task B). In one or more embodiments of the invention, the inputs are identified by an automated process.

In Step 215, a determination is made whether there are any unexecuted tasks that depend on available inputs, in accordance with one or more embodiments of the invention. If there are not unexecuted tasks that depend on available inputs, the method ends. If there are unexecuted tasks that depend on available inputs, the method proceeds to Step 220.

In Step 220 a determination is made whether any unexecuted tasks have sufficient inputs to start, in accordance with one or more embodiments of the invention. If there are not any unexecuted tasks with sufficient inputs to start, the method proceeds to Step 230. If there are unexecuted tasks with sufficient inputs to start, the method proceeds to Step 225.

In Step 225, the task(s) is executed, in accordance with one or more embodiments of the invention. The task may be executed in any manner now known or later developed. Further, the task may be executed without the task knowing where within the process flow the task is. In one or more embodiments of the invention, the task merely knows that the inputs necessary for the task are satisfied, and thus, the task will generate its designated output. After Step 225, the method returns to Step 220.

In Step 230, the method waits for another task to generate output, in accordance with one or more embodiments of the invention. The wait may be any amount of time, including waiting for some task which is currently running to update the Process Context with its outputs, or a static, pre-determined amount, or an amount of time based on the total expected execution time of the task/process, or any other suitable standard. After the waiting, the method returns to Step 215.

It will be apparent to one of ordinary skill in the art, having the benefit of this disclosure, that Steps 215, 220, 225, and 230, combine to dynamically generate and/or execute a process flow to produce a result. This dynamic generation of process flows is highly responsive to the available inputs. This can result in improved execution/response times, distributed system resiliency as well as improved efficiency. Further, the invention reduces the overhead in developing a process by removing the work in identifying the process flow (which is especially beneficial in a hybrid environment that includes remote, third party nodes, such as a cloud based Software as a Service (SaaS), where the process owner has no control over the internals, availability, and quality of that remote node). Thus, an individual need only recognize what tasks are necessary for a process and identify them—there is no need to organize the tasks. It will be apparent to one of ordinary skill in the art, having the benefit of this disclosure, that there are many ways to implement and/or perform the present invention and, as such, the invention should not be limited to the any of above examples.

Figure 3A:
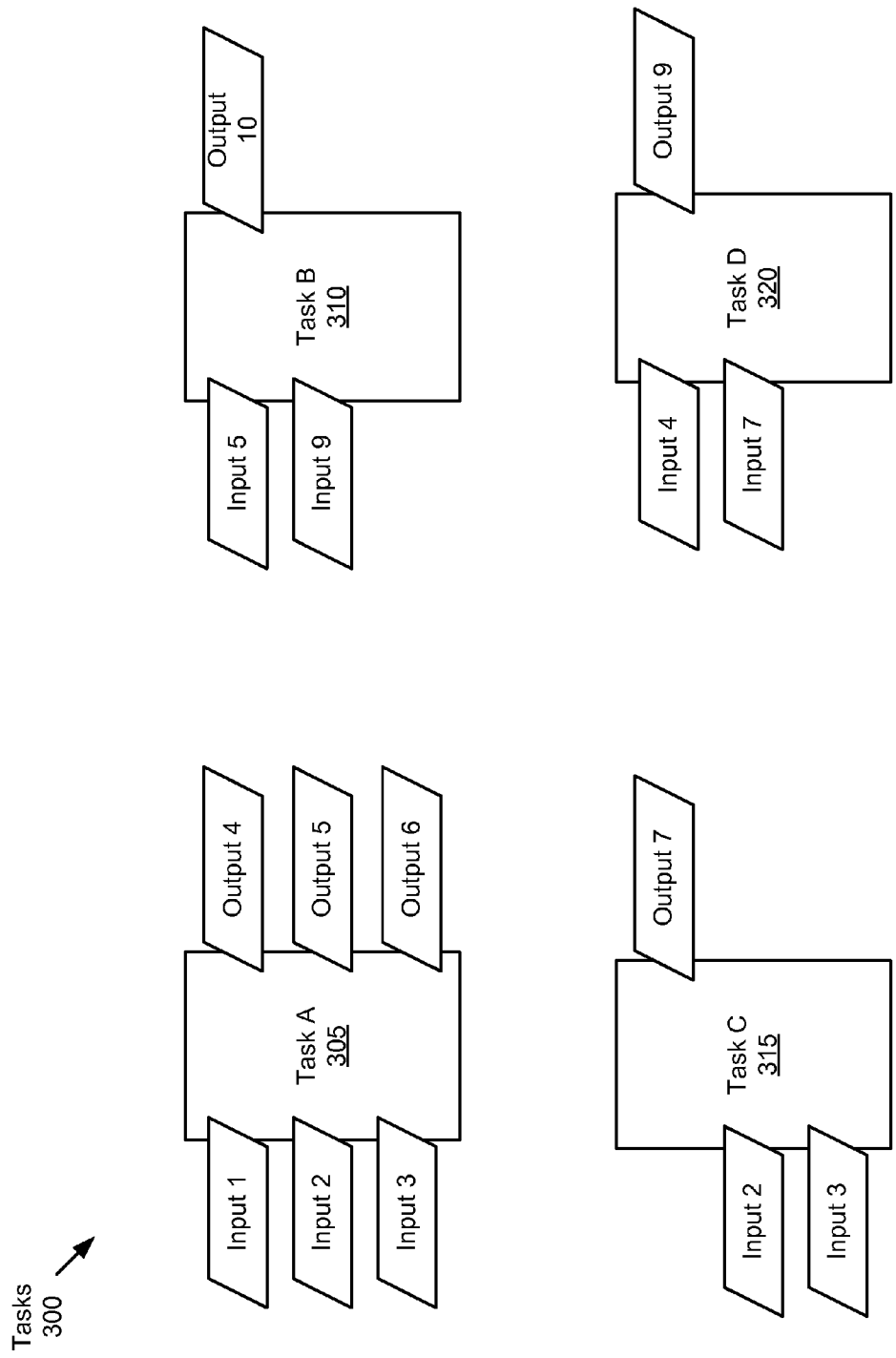
FIGS. 3A and 3B show an example in accordance with one or more embodiments of the invention.
Figure 3B:
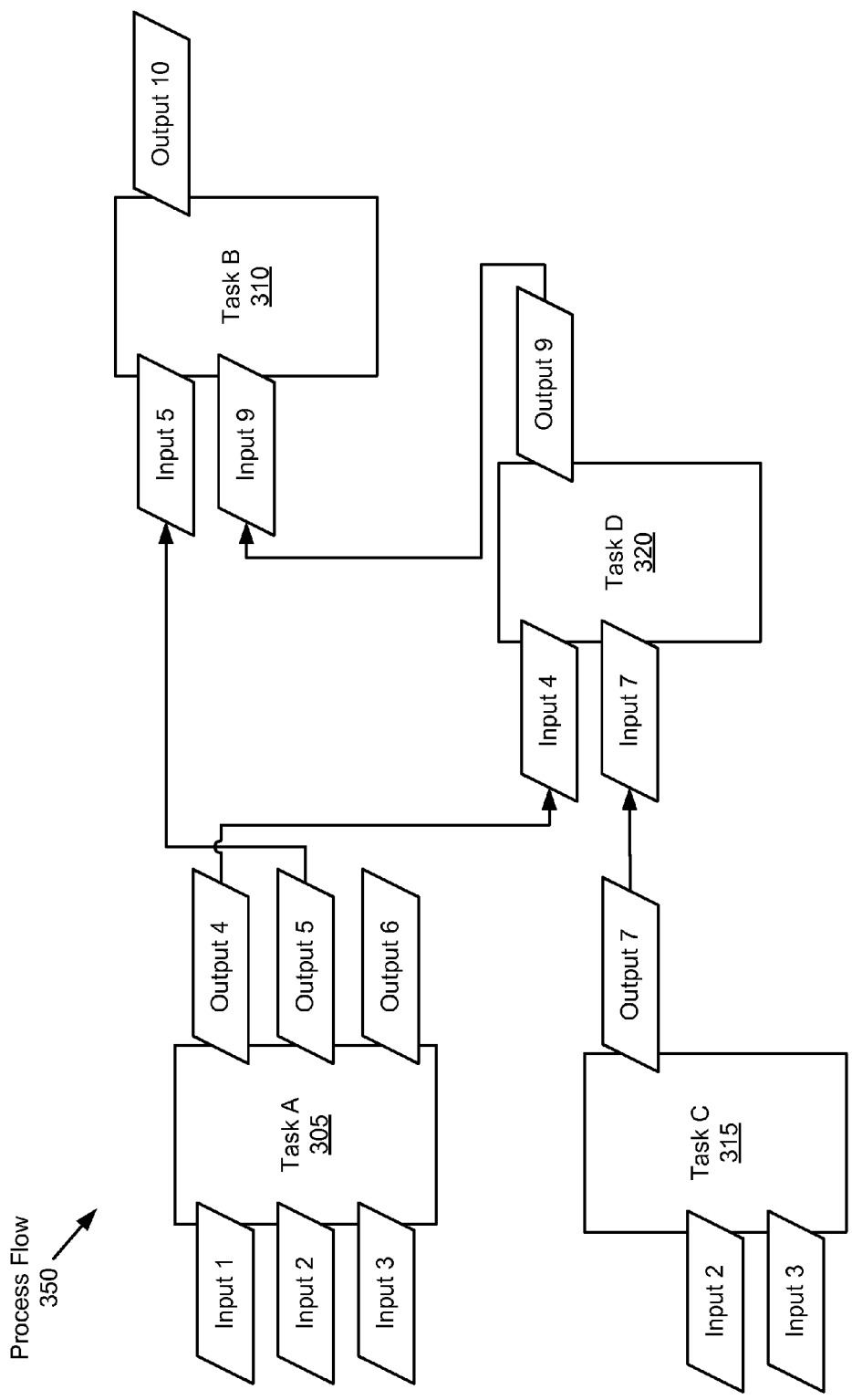

FIGS. 3A and 3B show an example of input driven process flow management in accordance with one or more embodiments of the invention. Specifically, FIG. 3A shows numerous tasks (300), which are tasks that have been identified as part of a process. The tasks (300) have been identified from a task repository (not shown) that includes many additional tasks, but for the process in this example, 4 tasks are needed: task A (305), task B (310), task C (315), and task D (320), each with the inputs and outputs as shown.

For example, task A (305) takes input 1, input 2, and input 3 to produce output 4, output 5, and output 6. In the interests of brevity, the exact inputs and outputs of the remaining tasks will not be repeated, but should be considered throughout this example. Further, in this example, an execution order of the identified tasks is not provided. Rather, the identified tasks are analyzed using the above-described method of the invention to the generate process flow (350) of FIG. 3B.

Turning to FIG. 3B, the process flow (350) is shown. Specifically, in FIG. 3B, the tasks (i.e., task A (305), task B (310), task C (315), and task D (320)) have had their inputs and outputs analyzed to determine a process flow (350), which shows the order of execution of the tasks. As shown in FIG. 3B, either task A (305) or task C (315) may execute first, or concurrently, depending on whether the necessary inputs are available. Once both task A (305) and task C (315) have generated their output, task D (320) may execute, generating the last input needed by task B (310), which completes the process when output 10 of task B (310) is generated.

It will be apparent to one of ordinary skill in the art, having the benefit of this disclosure, that the example described above in FIGS. 3A and 3B has been greatly simplified for ease of explanation and understanding and, as such, the invention should not be limited merely to the above example. In a more complicated example, the process flow may dynamically update as tasks execute. For example, if there are multiple ways to generate data needed for a task, the process flow may dynamically adjust according to which way is able to generate the data needed for the task the fastest or most efficiently. Likewise, if a task fails, or new data is located for inputs, then the process flow may adjust accordingly.

Additionally, in a more complex example, execution of a given process may occur across multiple nodes on a networked system. Execution may proceed without a central process controlling execution of the process flow because the context is stored with the process, rather than with individual tasks. Thus, execution may move between nodes of a networked system because the responsibility for completing the workflow resides with the data instead of at a remote central process.

In one or more embodiments, the invention enables a machine or designer to merely identify tasks needed to complete a process without regard for the specific implementation details of said tasks, and without knowing the actual execution order (or state) of said tasks. Thus, as an example, if a process is checking an e-mail account for a new e-mail and printing any new e-mails, a process designer may simply identify the tasks necessary to perform the process, such as: 1) retrieve e-mail address and password; 2) access e-mail using address and password; 3) check for new e-mail; and 4) print new e-mail if present. No further steps or technically knowledge is needed. Provided that the tasks are in the task repository, one or more embodiments of the invention are able to determine the order in which to perform the tasks and when the necessary inputs are present for performing the tasks, and adjust as needed. In one or more embodiments of the invention, the process is not determined based on the tasks that need to be completed. Rather, the invention simply evaluates what tasks (if any) can be started based on the available input at a given moment. The tasks starts naturally when the needed inputs are available, and generate their designated outputs. If other tasks can start based on newly available data, those tasks start next, and so on. The process occurs naturally, with no one having to actually describe it.

Figure 4:
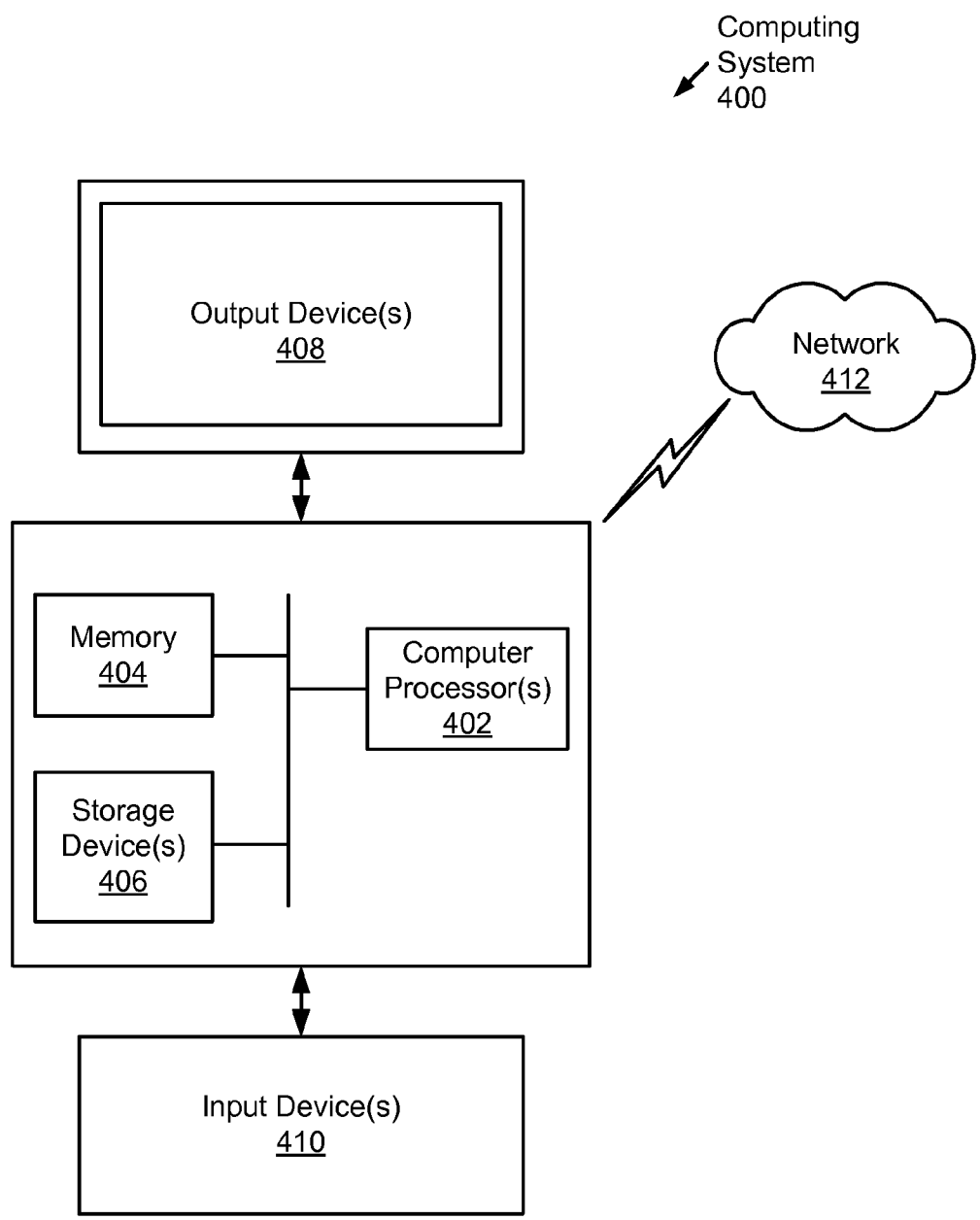
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device, each with one or more computer processors. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for input driven process flow management, comprising:
   identifying a process comprising a plurality of tasks;
   receiving a plurality of requests comprising a first request to execute a first task of the process and a second request to execute a second task of the process;
   receiving a first set of inputs;
   determining, based on a first list of dependent inputs of the first task, that the first set of inputs is sufficient for executing the first task;
   selecting the first task to start as a first process flow step for the process;
   executing the first process flow step to generate a first result;
   receiving a second set of inputs, comprising at least the first result;
   further determining, based on a second list of dependent inputs of the second task, that the second set of inputs is sufficient for executing the second task;
   selecting the second task to start as a second process flow step for the process, wherein the second process flow step is different than the first process flow step; and
   executing the second process flow step to generate a second result.

2. The method of claim 1, further comprising:
   generating a context for the process, wherein the context stores a plurality of data elements generated during the process.

3. The method of claim 2,
   wherein each of the plurality of data elements comprises a data element name, a data element value, and a generating task, and
   wherein the context is passable.

4. The method of claim 2, further comprising:
   locking the context;
   writing a new data element to the context; and
   releasing the lock on the context.

5. The method of claim 1, further comprising:
   executing a process flow to generate a result of the process,
   wherein the process flow comprises an ordered sequence of process flow steps that are ordered based on available inputs,
   wherein executing the process flow comprises executing the first process flow step prior to executing the second process flow step,
   wherein the result of the process is based on at least the first result and the second result, and
   wherein each of the plurality of tasks is stateless.

6. The method of claim 1, wherein one of the plurality of tasks is determining whether an authentication credential is valid.

7. The method of claim 1, wherein one of the plurality of tasks is determining whether a first node is permitted to execute a third task of the subset, and whether the third task is permitted to delegate execution to a second node using a cryptographic authorization mechanism.

8. A non-transitory computer-readable storage medium comprising computer-readable code for input driven process flow management, when executed by a processor, comprises functionality to:
   identify a process comprising a plurality of tasks;
   receive a plurality of requests comprising a first request to execute a first task of the process and a second request to execute a second task of the process;
   receive a first set of inputs;
   determine, based on a first list of dependent inputs of the first task, that the first set of inputs is sufficient for executing the first task;
   select the first task to start as a first process flow step for the process;
   execute the first process flow step to generate a first result;
   receive a second set of inputs, comprising at least the first result;
   further determine, based on a second list of dependent inputs of the second task, that the second set of inputs is sufficient for executing the second task;
   select the second task to start as a second process flow step for the process, wherein the second process flow step is different than the first process flow step; and
   execute the second process flow step to generate a second result.

9. The non-transitory computer-readable storage medium of claim 8, the computer-readable code further comprising functionality to:
   generate a context for the process, wherein the context stores a plurality of data elements generated during the process.

10. The non-transitory computer-readable storage medium of claim 9,
    wherein each of the plurality of data elements comprises a data element name, a data element value, and a generating task, and
    wherein the context is passable.

11. The non-transitory computer-readable storage medium of claim 9, the computer-readable code further comprising functionality to:
    lock the context;
    write a new data element to the context; and
    release the lock on the context.

12. The non-transitory computer-readable storage medium of claim 8, the computer-readable code further comprising functionality to:
    execute a process flow to generate a result of the process,
    wherein the process flow comprises an ordered sequence of process flow steps that are ordered based on avaialble inputs,
    wherein executing the process flow comprises executing the first process flow step prior to executing the second process flow step,
    wherein the result of the process is based on at least the first result and the second result, and
    wherein each of the plurality of tasks is stateless.

13. The non-transitory computer-readable storage medium of claim 8, wherein one of the plurality of tasks is determining whether a first node is permitted to execute a third task of the subset, and whether the third task is permitted to delegate execution to a second node using a cryptographic authorization mechanism.

14. A system for input driven process flow management, the system comprising:
    a computer processor; and
    a memory storing instructions which, when executed by the computer processor, comprise functionality to:
      identify a process comprising a plurality of tasks;
      receive a plurality of requests comprising a first request to execute a first task of the process and a second request to execute a second task of the process;

receive a first set of inputs;
determine, based on a first list of dependent inputs of the first task, that the first set of inputs is sufficient for executing the first task;
select the first task to start as a first process flow step for the process;
execute the first process flow step to generate a first result;
receive a second set of inputs, comprising at least the first result;
further determine, based on a second list of dependent inputs of the second task, that the second set of inputs is sufficient for executing the second task;
select the second task to start as a second process flow step for the process, wherein the second process flow step is different than the first process flow step; and
execute the second process flow step to generate a second result.

15. The system of claim 14, further comprising functionality to:
generate a context for the process, wherein the context stores a plurality of data elements generated during the process.

16. The system of claim 15,
wherein each of the plurality of data elements comprises a data element name, a data element value, and a generating task, and
wherein the context is passable.

17. The system of claim 15, further comprising functionality to:
lock the context;
write a new data element to the context; and
release the lock on the context.

18. The system of claim 14, further comprising functionality to:
execute a process flow to generate a result of the process,
wherein the process flow comprises an ordered sequence of process flow steps that are ordered based on available inputs,
wherein executing the process flow comprises executing the first process flow step prior to executing the second process flow step,
wherein the result of the process is based on at least the first result and the second result, and
wherein each of the plurality of tasks is stateless.

19. The system of claim 14, wherein one of the plurality of tasks is determining whether an authentication credential is valid.

20. The system of claim 14, wherein one of the plurality of tasks is determining whether a node is permitted to execute a third task of the subset, and whether the third task is permitted to delegate execution to another node using a cryptographic authorization mechanism.

* * * * *